United States Patent [19]

Landy et al.

[11] Patent Number: 5,096,349

[45] Date of Patent: Mar. 17, 1992

[54] NUT MOUNTING GROMMET

[75] Inventors: Michael A. Landy, Bellevue; Roger T. Bolstad, Seattle; Charles M. Copple, Kent; Darryl E. Quincey, Seattle; Eric T. Easterbrook, Kent; Leonard F. Reid, Bellevue; Louis A. Champoux, deceased, late of Bellevue, all of Wash., by Charlotte, Champoux, Executrix

[73] Assignee: Fatigue Technology, Inc., Seattle, Wash.

[21] Appl. No.: 558,900

[22] Filed: Jul. 26, 1990

[51] Int. Cl.⁵ ............................ F16B 37/04; F16B 39/28
[52] U.S. Cl. .................................. 411/108; 411/113; 411/183; 411/969
[58] Field of Search ........ 411/103, 105, 108, 111–113, 411/173, 177, 183, 968, 969

[56] References Cited

U.S. PATENT DOCUMENTS

| 2,078,411 | 4/1937  | Richardson     | 411/113 |
| 2,217,026 | 10/1940 | Nickerson      |         |
| 2,333,386 | 11/1943 | Murphy         |         |
| 2,421,201 | 5/1947  | Hallock        |         |
| 2,560,961 | 7/1951  | Knohl          |         |
| 2,802,503 | 8/1957  | Zupa           |         |
| 2,986,188 | 5/1961  | Karp et al.    | 411/103 |
| 2,993,373 | 7/1961  | Bloedow        | 189/36  |
| 3,126,039 | 3/1964  | Fiddler        |         |
| 3,305,987 | 2/1967  | Weaver         | 52/283  |
| 3,316,953 | 5/1967  | Fransson et al.|         |
| 3,620,119 | 11/1971 | King, Jr. et al. |       |
| 4,295,766 | 10/1981 | Shaw           | 411/113 |
| 4,425,780 | 1/1984  | Champoux       | 72/370  |
| 4,768,907 | 9/1988  | Gauron         | 411/85  |
| 4,830,557 | 5/1989  | Harris et al.  | 411/113 |

FOREIGN PATENT DOCUMENTS 482929 12/1969 Switzerland .
495976 11/1938 United Kingdom ............... 411/113

Primary Examiner—Neill R. Wilson
Attorney, Agent, or Firm—Delbert J. Barnard

[57] ABSTRACT

A circular opening (48) is formed in a structural wall (12). A tubular shank (28) of a nut mounting grommet (26) is inserted into the opening (48). The grommet (26) is moved endwise to place a shoulder surface (34) on the base of a nut mounting cup (30) against the wall (12). A split sleeve (54) is installed on a small diameter portion (62) of a mandrel (52) and the mandrel and sleeve (52, 54) are inserted into the tubular shank (28) from the side of the wall (12) opposite the nut receiving cup (30). The mandrel (52) is then retracted to successively move increasing and maximum diameter portions (64, 66) of the mandrel (52) through the split sleeve (54). The mandrel portions (64, 66) exert a radially outwardly expanding force on the split sleeve (54). The split sleeve (54) in turn imposes a radially outwardly expanding force on the tubular shank (28). This causes a plastic deformation of the tubular shank (28), creating a tight interference fit between the tubular shank (28) and the sidewall of the opening (48). In this manner, the grommet (26) is firmly secured to the wall (12). Next, a nut (24) is inserted into the cup (30) with its threaded central opening (18) in alignment with the passageway through the tubular shank (28). The sidewall of the cup (30) is deformed, to place portions of a lip (46) endwise of the nut (20), in the path of removal of the nut (20) from the cup (30). The sidewall of the cup (30) includes wrench flats (98) outwardly bounding wrench flats (100) on the nut (20).

15 Claims, 10 Drawing Sheets.

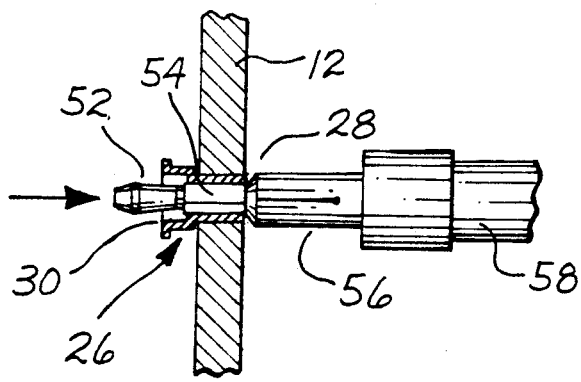
Fig. 14
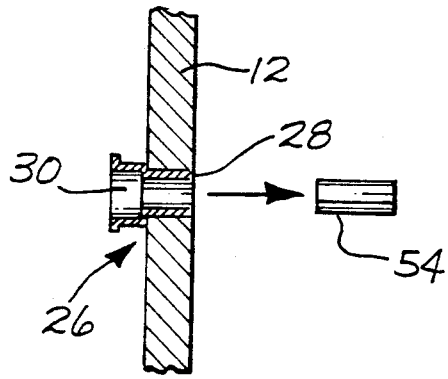
Fig. 15
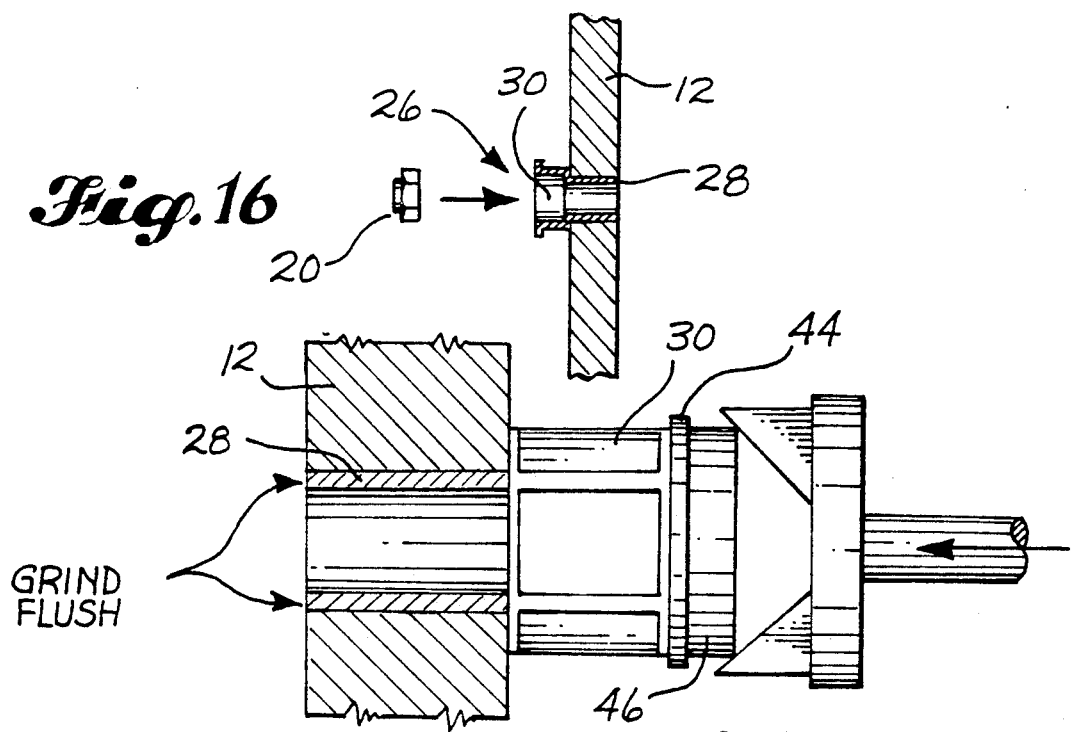
Fig. 16
Fig. 17

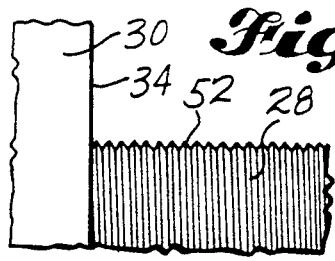
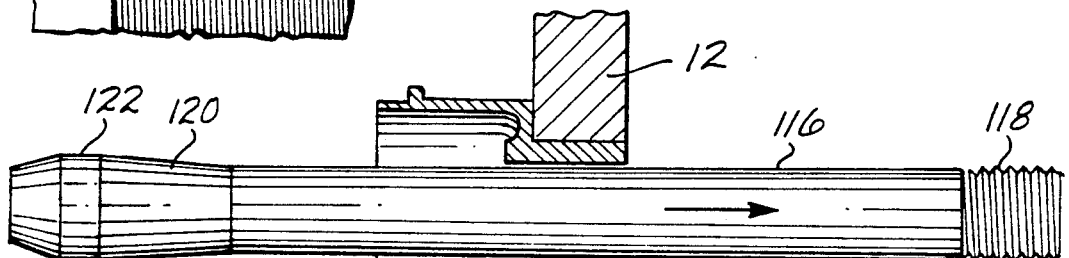
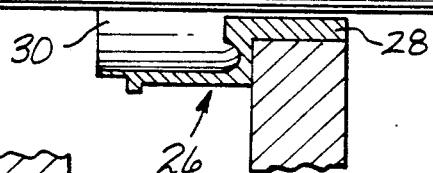
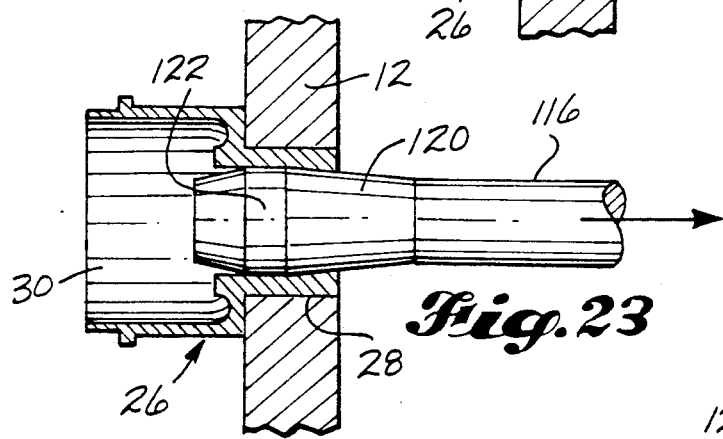
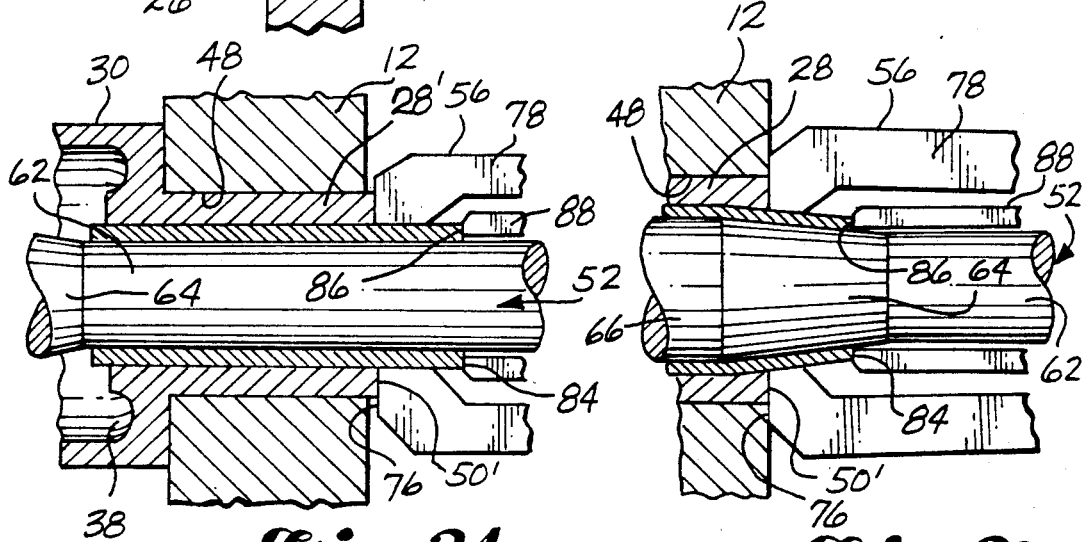
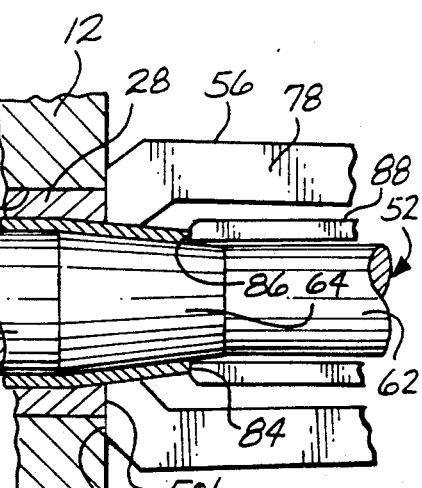

NUT MOUNTING GROMMET

TECHNICAL FIELD

The present invention relates to the provision of a nut mounting grommet as a replacement for a nut plate.

BACKGROUND INFORMATION

A nut plate is a small plate to which a fastener nut is secured. It is used in aircraft on walls which do not permit the use of a tapped opening. The nut plate typically includes a pair of fastener openings spaced diametrically apart on opposite sides of the nut. Fastener openings matching the fastener openings in the nut plate are drilled in a wall to which the nut plate is secured. The nut plate is positioned on the wall with its fastener openings in alignment with the fastener openings that were formed in the wall. Then rivets or other suitable fasteners are inserted into the aligned openings and secured in place to in turn secure the nut plate to the wall. A problem with this type of system is that there is wear at the rivets and fatigue in the wall through which the rivets extend.

The nut carried by the nut plate includes a threaded opening for receiving a threaded end portion of a bolt. It is necessary that the wall include an opening for the bolt as the bolt is installed from the side of the wall opposite the nut. Accordingly, when a nut plate is used, it is necessary to form at least three openings in the wall for each nut, one to serve as a passageway for the bolt and at least two others to serve as fastener openings to receive fasteners that are used to secure the nut plate to the wall.

A principal object of the present invention is to provide a substitute for the nut plate which requires the formation of a single opening in the wall. Other nut plate substitutes are known, such as a flare nut and nuts on a carrier having a tubular mounting portion which is intended to friction fit within a single opening. A problem with such fasteners is that they rotate in the opening and do not stay in place and/or the opening provides a fatigue problem area.

Prior art nut retainers are disclosed by U.S. Pat. No. 2,333,386, granted Nov. 2, 1943, to Howard J. Murphy, by U.S. Pat. No. 2,421,201, granted May 27, 1947, to Robert L. Hallock, by U.S. Pat. No. 4,768,907, granted Sept. 6, 1988, to Richard F. Gauron, and by Swiss Patent No. 482,929, granted Dec. 15, 1969, to Josef Bucheli. Each of these patents discloses a type of gang nut assembly.

DISCLOSURE OF THE INVENTION

The nut plate substitute, provided by the present invention is what may be referred to as a nut mounting grommet. Such grommet is firmly connectable to a structural wall by use of a single circular opening in the wall.

According to the invention, the grommet is basically characterized by a tubular shank having an outside diameter sized for close fit insertion into the circular opening, and a substantially uniform inside diameter. A nut cage or retainer is formed integral with or is connected to the tubular shank at one end of the tubular shank. The nut cage is adapted to receive a nut following securement of the grommet to the wall. The nut cage includes a base that is larger than the circular opening in the wall. A radial shoulder is formed where the tubular shank joins the nut cage. The tubular shank is inserted into the circular opening and moved inwardly to place the shoulder substantially against the wall. The base includes a circular base opening that is in alignment with and substantially equal in diameter to the interior of the tubular shank. The base opening and the tubular shank together form a receiving passageway for expansion tooling. Following installation of the grommet, this same passageway serves as a passageway for the bolt that is to be connected to the nut.

According to the invention, the tubular shank of the nut mounting grommet is expanded radially by the use of expansion tooling. The tubular shank is constructed from a material that in response to radial expansion on it will become permanently larger in diameter. The expansion causes the tubular shank to make a tight interference fit with the wall opening to in that manner secure the grommet to the wall. Also, residual compressive stresses are developed in the wall material about the opening.

According to an aspect of the invention, the tubular shank portion of the grommet is inserted into the opening in the wall and the grommet is moved endwise to place its shoulder against the wall. A mandrel is provided of a type having, in series, a small diameter portion, an increasing diameter portion, and a maximum diameter portion. In preferred form, a one piece split sleeve which is prelubricated inside is placed on the small diameter portion of the mandrel. The mandrel and split sleeve are then inserted into the grommet and positioned to place the increasing diameter and maximum diameter portions of the mandrel on the nut cage side of the wall. Then, the split sleeve and grommet are held in a fixed axial position within the opening and the mandrel is moved axially through the split sleeve. Movement of the increasing and maximum diameter portions of the mandrel through the split sleeve expands the split sleeve radially. The expanding split sleeve applies a radially outwardly directed force on the tubular shank portion of the grommet. This expands the tubular shank portion within the opening. Alternatively, a mandrel only can be used for expanding the tubular shank.

According to the invention, the mandrel and split sleeve are so sized that the radial expansion of the split sleeve asserts sufficient radial forces on the tubular shank portion of the grommet to plastically expand the tubular shank portion of the grommet and place the sidewall of the opening into a tight gripping contact with the outer surface of the tubular shank portion of the grommet. Following movement of the mandrel through the split sleeve, the split sleeve is removed from the tubular shank.

According to the invention, following securement of the nut mounting grommet to the wall, a nut is placed into the nut retainer and is secured within the nut retainer. It is held against rotation and is prevented from moving out from the nut retainer.

In preferred form, the nut retainer is in the form of a tubular cup, hexagonal in cross-section, having a sidewall that is longer than the nut. As a result, when the nut is in the cup a portion of the sidewall projects endwise beyond the nut. The end portion of the cup sidewall is deformed inwardly to place a part of it in the path of removal of the nut from the cup. The sidewall of the tubular cup includes wrench flats which engage the wrench flats on the nut and hold the nut against turning while a bolt is being threaded into the nut.

Other objects, features and advantages of the invention will be hereinafter described in greater detail, as a part of the description of the best mode and the alternative embodiments of the invention.

BRIEF DESCRIPTION OF THE DRAWINGS

In the drawing, like reference numerals are used to designate like parts throughout the several views, and:

FIGS. 10-17 are diagrammatic views of the major steps of the invention;

FIG. 21 is an enlarged scale fragmentary sectional view in the vicinity of the outer wall of the tubular shank of the nut mounting grommet, showing sharp edge ridges formed on the surface between valleys;

FIG. 22 is a view like FIG. 13, but showing the installation of tooling in a mandrel only system;

FIG. 23 is a view like FIG. 22, showing the mandrel being pulled through the tubular shank of the nut mounting grommet;

FIG. 24 is a view like FIG. 18, but showing an installation in which the tubular shank of the nut mounting grommet is longer than the wall is thick, and showing the nose piece against the end of the tubular shank;

FIG. 25 is a view like FIG. 19, but of the embodiment shown by FIG. 24, such view showing the projected end portion of the tubular shank being flattened by a force applied to it by the power puller;

BEST MODE FOR CARRYING OUT THE INVENTION

Figure 1:
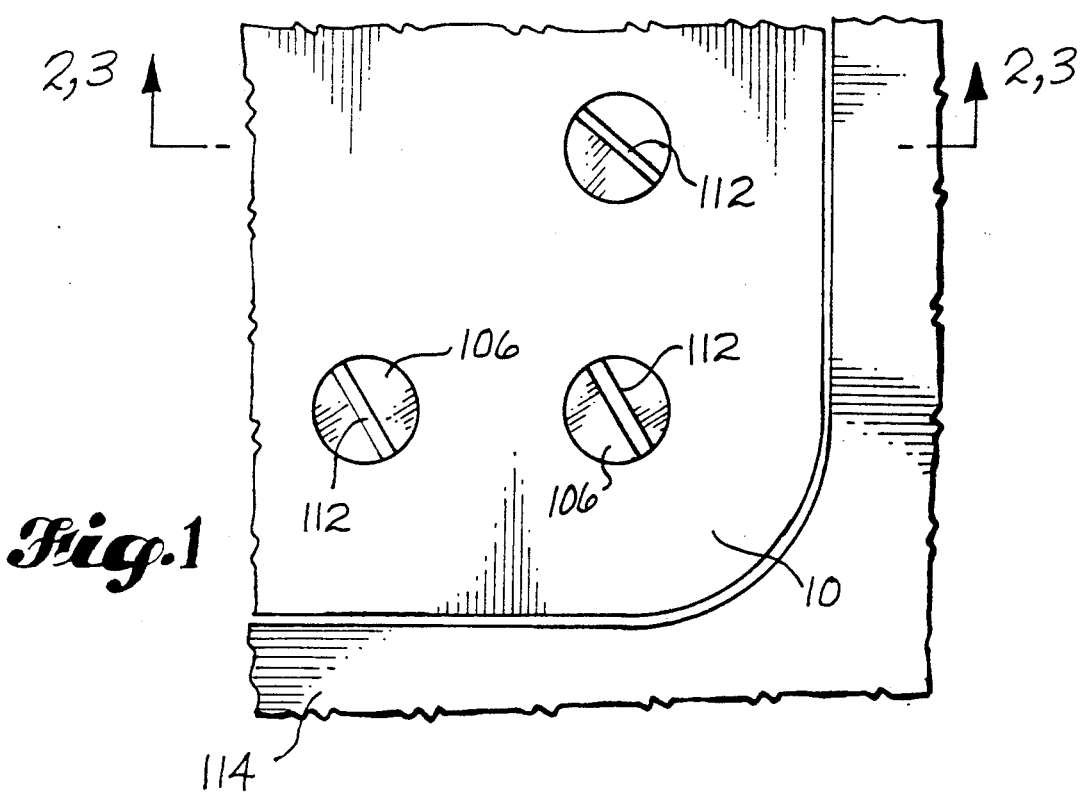
FIG. 1 is a fragmentary plan view of a corner portion of an inspection plate or the like which is secured in place by use of a plurality of fastener bolts.
Figure 2:
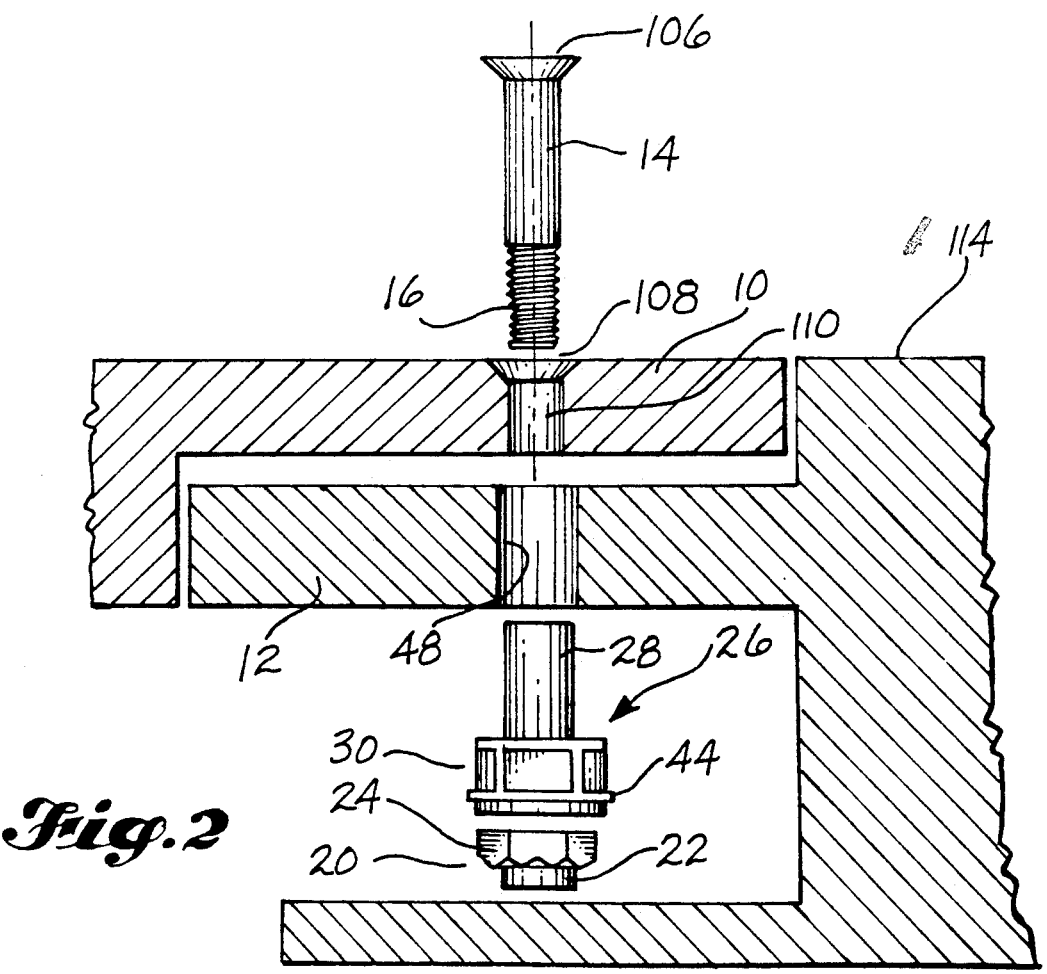
FIG. 2 is a fragmentary sectional view taken substantially along line 2—2 of FIG. 1, with the several parts shown exploded apart, and with some parts shown in side elevation.
Figure 3:
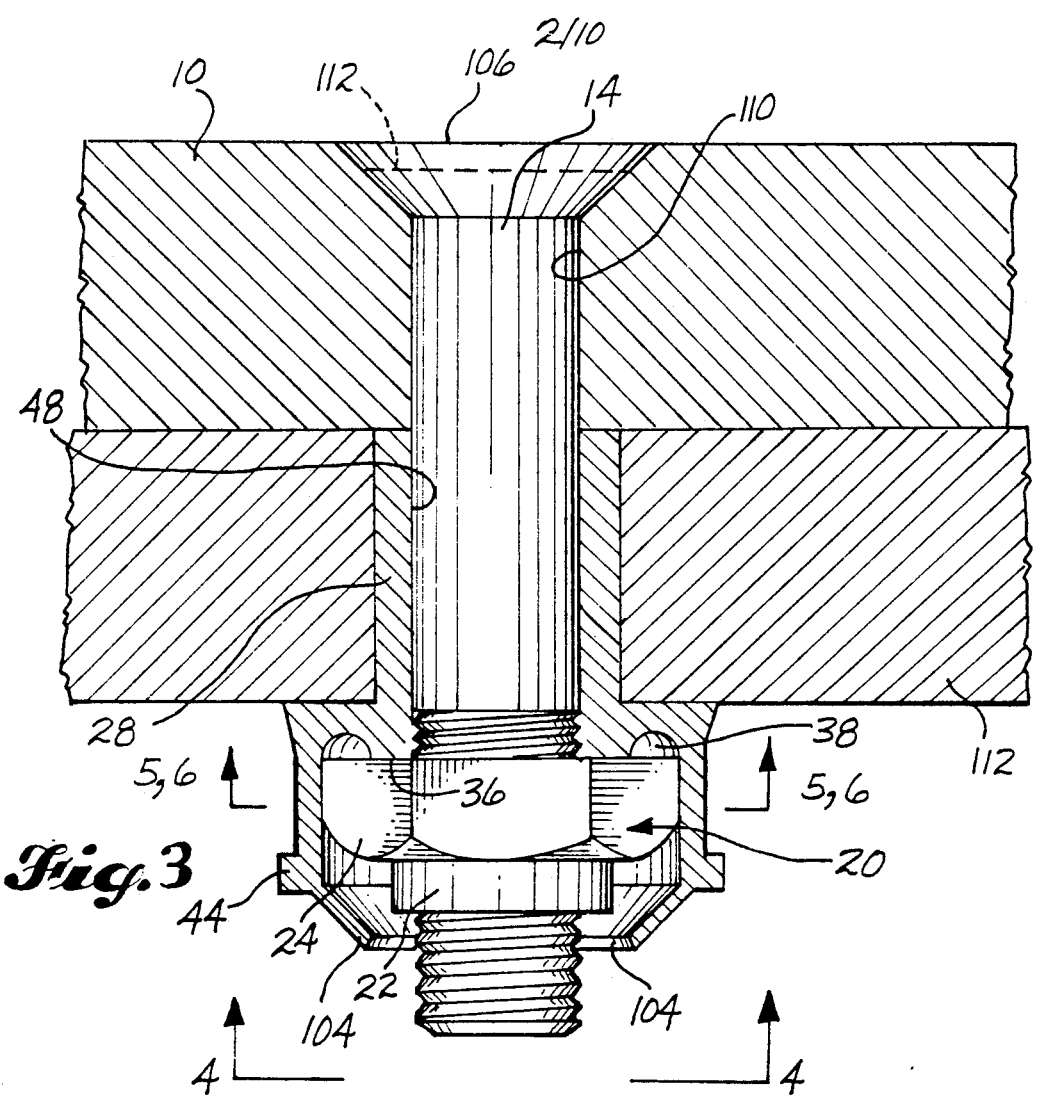
FIG. 3 is an enlarged scale sectional view also taken substantially along line 2, 3—2, 3 of FIG. 1, showing the fastener parts in an assembled condition.
Figure 4:
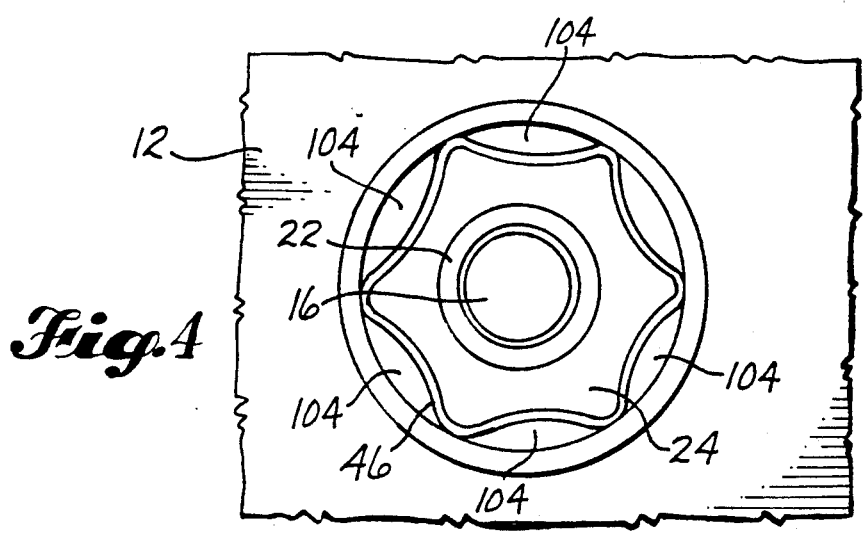
FIG. 4 is a bottom plan view taken substantially along the aspect of line 4—4 of FIG. 3.

Referring to FIGS. 1-3, member 10 is an example first member which needs to be removably secured to an example second member 12. By way of typical and therefore nonlimitive example, member 10 may be an inspection plate and member 12 may be a flange which borders an opening that is normally covered by the inspection plate 10. The cover plate 10 is secured to the flange 12 by means of a plurality of bolts 14 which include threaded end portions 16. The threaded portion 16 of each bolt 14 screws into a threaded opening 18 (FIGS. 5 and 6) in a nut 20. The nut 20 that is illustrated is a conventional aircraft nut. It includes a tubular center portion 22 and a base portion 24. A threaded opening extends through the tubular portion 22. The base portion 24 includes wrench flats on its sides.

Figure 8:
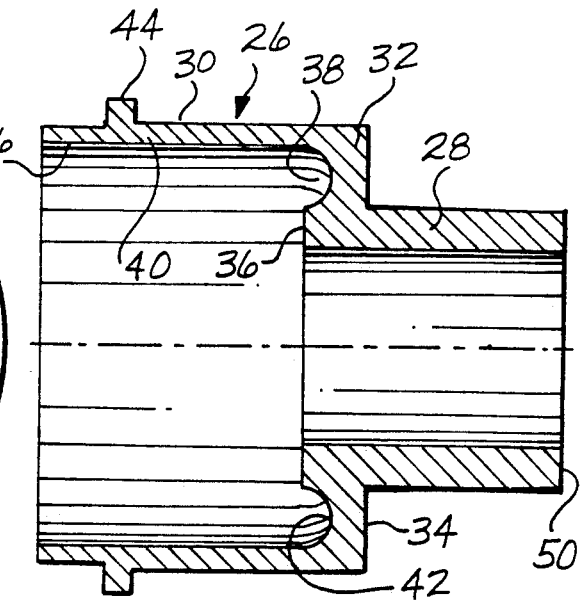
FIG. 8 is a longitudinal sectional view taken substantially along line 8—8 of FIG. 7.

In accordance with the invention, the nut 20 is held in place by a nut mounting grommet 26. Grommet 26 comprises a tubular shank 28 and a nut cage 30 that is integral with the tubular shank 28, as best illustrated in FIG. 8.

In the preferred embodiment, nut cage 30 is in the form of a tubular cup. Cup 30 has a base end formed by a radial wall 32. Radial wall 32 includes a shoulder surface 34 formed where the cup 30 joins the tubular shank 28. Inside the cup 30 the base wall 32 presents a base surface 36 against which the nut 20 bears. Surface 36 may also be termed a nut bearing surface. An annular groove 38, semicircular in cross section, is formed in the inner side of base wall 32, between nut bearing surface 36 and the tubular sidewall 40 of cup 30. This construction permits the formation of a radius 42 at the intersection of the base wall 32 and the cup sidewall 40, without interference between the radius 42 and the nut 20. If nut bearing surface 36 were to be continued radially outwardly to a radius extending between it and the sidewall 40, such radius would be contacted by the peripheral portion of the nut and the nut would not bear tight against the surface 36. The use of the groove 38 positions the radius 42 endwise of the surface 36, away from the nut 20, so that the nut 20 can contact and bear against the surface 36 without its periphery contacting the radius 42.

In the preferred embodiment, the nut cage cup 30 includes a reinforcing girth ring or rib 44 and a sidewall portion 46 which projects axially beyond the rib 44. Preferably, wall portion 46 is thinner than the cup sidewall 40 in its extent between rib 44 and base wall 32, as is clearly illustrated in FIG. 8.

The tubular shank 28 is sized to snugly fit within an opening 48 formed in structural wall 12. Shank 28 may have a length measuring from shoulder 34 to end surface 50 which is substantially equal to or, preferably, longer than the thickness of the wall 12 where the circular opening 48 is formed. Grommet 26 may be manufactured by use of a lathe and then pressed to give cup sidewall 40 a hexagonal shape. By way of example, grommet 26 may be constructed from stainless steel (e.g. 17-4PH stainless steel, per ANS5643).

As shown by FIG. 21, the outer surface 52 of tubular shank 28 may be treated so as to increase its coefficient of friction. It may be machined or otherwise treated to provide projections which can interlock with the sidewall surface of the opening 48, as will hereinafter be described in greater detail.

Figure 9:
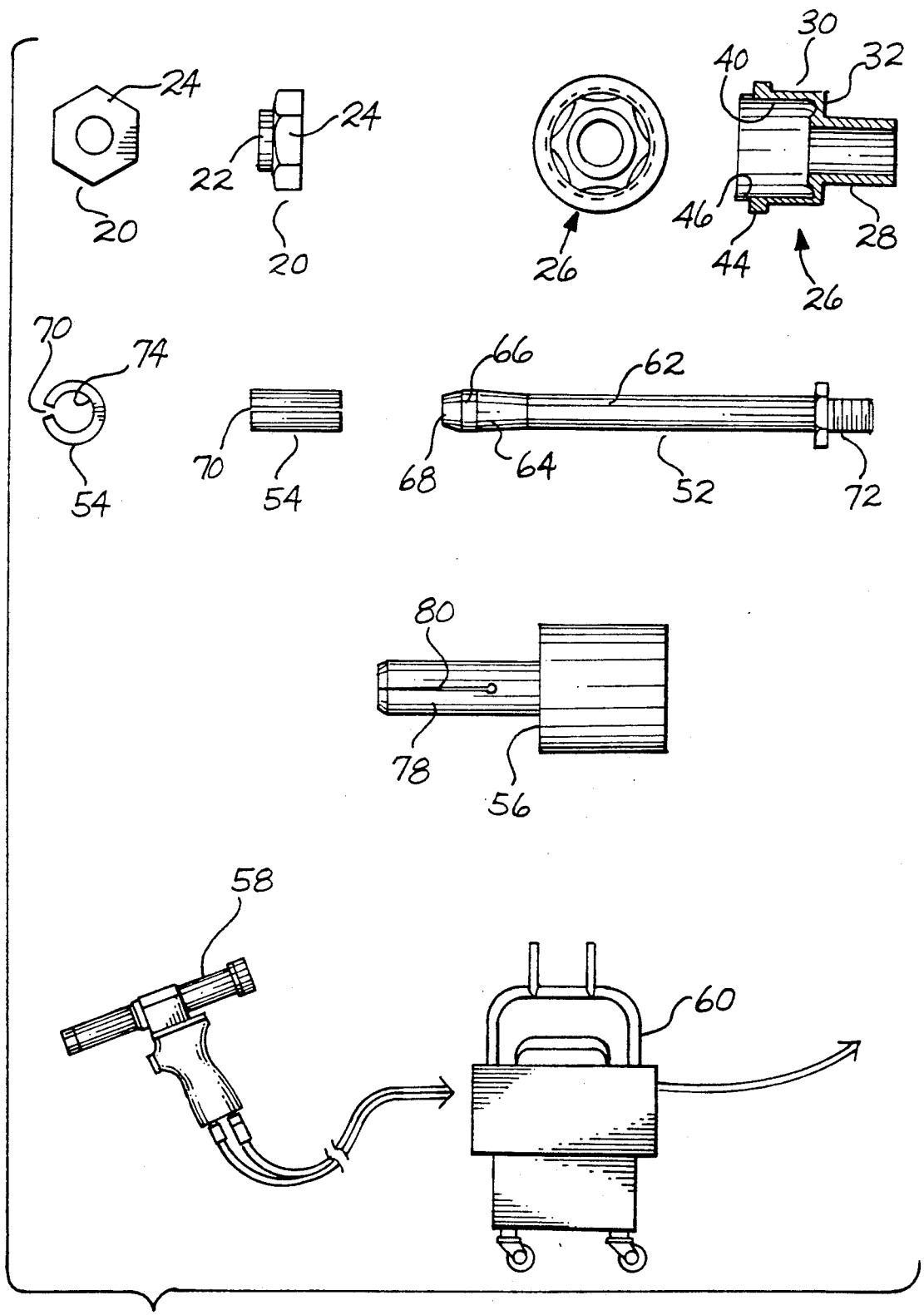
FIG. 9 is a diagrammatic view of tools used for performing the method aspect of the invention.
Figure 10:
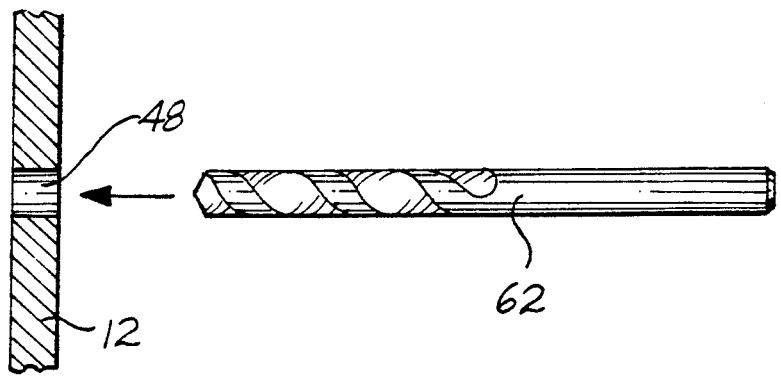
Figure 11:
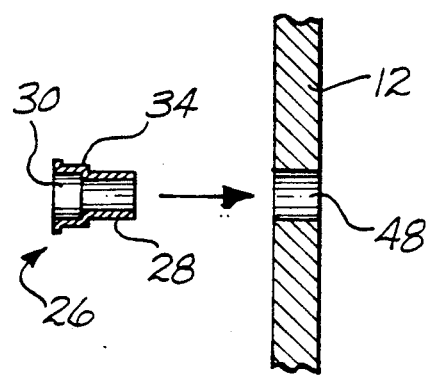
Figure 12:
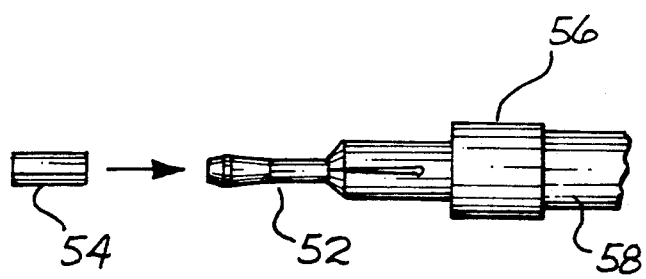

Referring to FIG. 9, this view shows most of the tooling used for securing the nut mounting grommet to a wall and a nut within the nut cage. The nut 20 and the grommet 26 are also included in FIG. 9.

In preferred form, the grommet 26 is installed by the use of a split sleeve expansion method. The tools for this method include a mandrel 52, a split sleeve 54, a nose piece 56, a power puller 58 and a power source 60 for the puller 58. Puller 58 may be a puller gun of the type that is disclosed in U.S. Pat. No. 4,187,708, granted Feb. 12, 1980, to Louis A. Champoux. The mandrel 52, sleeve 54 and nose piece 56 are essentially like the mandrel, the split sleeve and nose piece disclosed in U.S. Pat. No. 4,425,780, granted Jan. 17, 1984, to Louis A. Champoux. For this reason, these tools will not be described in detail herein. Rather, the disclosures of these tools, set forth in U.S. Pat. Nos. 4,187,708 and 4,425,780 are incorporated herein by reference.

Referring to FIGS. 10-20, a method of the invention will now be described. A drill bit 62 installed in a power drill (not shown) is used to drill the opening 48 in wall 12. Next, the tubular shank 28 of the grommet 26 is inserted into the opening 48. Grommet 26 is moved endwise until the shoulder 34 is against the wall 12. The nose piece 56 is attached to the puller gun 58, in the manner disclosed in the aforementioned U.S. Pat. Nos. 4,187,708 and 4,425,780.

Mandrel 52 includes, in series, a small diameter portion 62, an increasing diameter portion 64, a maximum diameter portion 66, and a tapered end portion 68. The split sleeve 54 is installed onto the small diameter portion 62 of the mandrel 52. This is done by inserting the mandrel 52 endwise into the split sleeve 54. The nose portion 68 enters into the split sleeve 54 and expands it, causing the gap or split 70 to open. The split sleeve 54 is moved towards the based end 72 of the mandrel 52 until the split sleeve 54 is positioned on the reduced diameter portion 62. When the split sleeve 54 is on the reduced diameter portion 62 it contracts in size and the gap 70 closes. When split sleeve 54 is on the minimum diameter portion 62 of mandrel 52 it has an outside diameter which is less than or equal to the outside diameter of the maximum diameter portion 66. The center passageway through the tubular shank 28 is sized to pass both the maximum diameter portion 66 and mandrel 52 and the sleeve 54 while it is on the minimum diameter portion 62 of mandrel 52. Split sleeve 54 includes a dry lubricant coating 74 on its inner surface.

Figure 13:
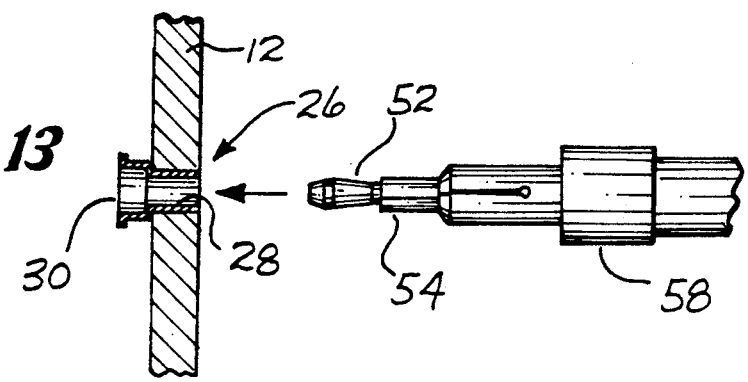
Figure 18:
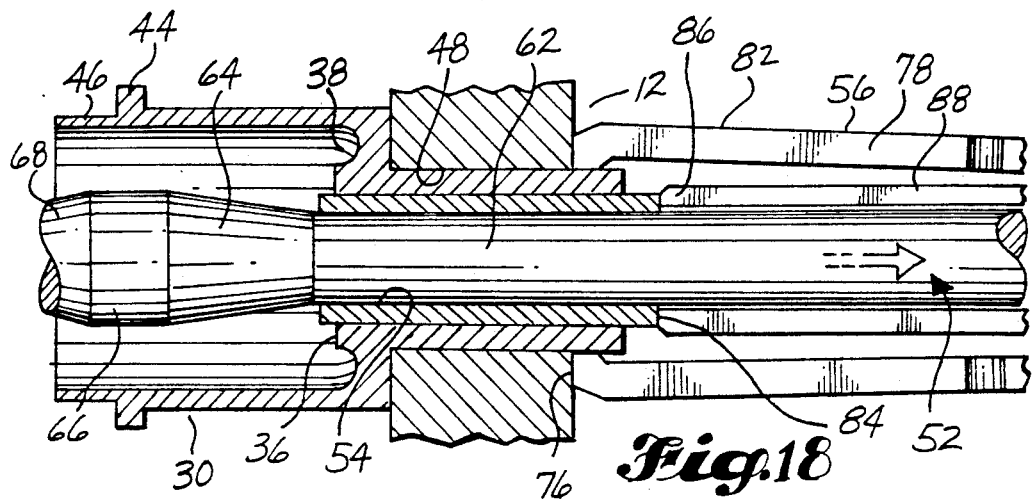
FIG. 18 is a fragmentary longitudinal sectional view showing the tooling at the start of the method, with the mandrel being shown in side elevation.

Referring to FIG. 13, the mandrel 52, with split sleeve 54 installed on it, is inserted through the center passageway of the tubular shank portion 28 of the grommet 26 from the side of wall 12 that is opposite the nut cage 30. As best shown by FIG. 18 the nose piece 56 is moved towards the wall 12 until its end surface 76 makes contact with the wall 12.

Figure 19:
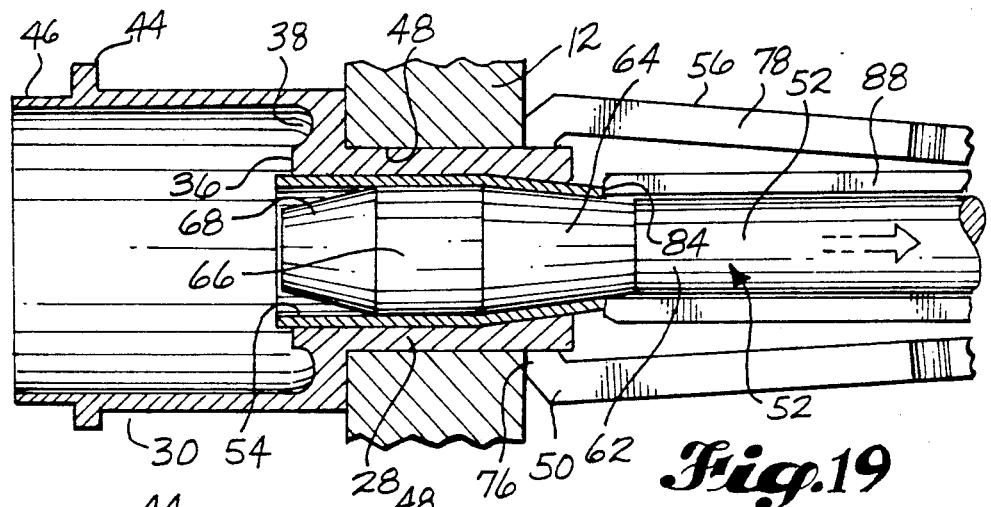
FIG. 19 is a view like FIG. 18, but showing the head of the mandrel in the process of moving through the split sleeve and the tubular shank portion of the grommet.
Figure 20:
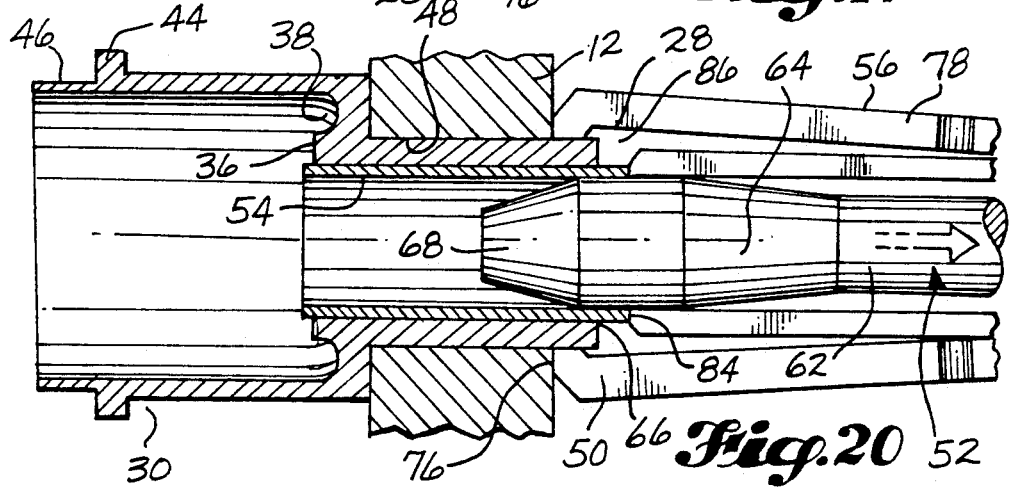
FIG. 20 is a view like FIGS. 18 and 19, showing the mandrel head in a retracted position within the nose piece of the puller.

As best shown by FIGS. 18-20, the tubular shank 28 of grommet 26 is, in the preferred embodiment, longer than the wall 12 is thick. This permits use of a single size nut mounting grommet 26 for several wall thicknesses. Following installation of the grommet 26, the projecting end piece of tubular shank 28 is removed by grinding, ets.

The nose piece 56 is composed of longitudinal segments 78 which are separated by longitudinal splits 80. This construction allows the nose piece 56 to expand radially as the tubular shank 28 is expanded by the mandrel and split sleeve. It also allows the end portion of the tubular shank 28 to extend into the nose piece 56, allowing the end surfaces of nose piece segments 78 to contact the wall 12, apart from the tubular shank 28. At the start of operation, the split sleeve 54 is positioned on the minimum diameter portion 66 of the mandrel 42.

The end surface 84 of split sleeve 54 contacts an end surface 86 of a sleeve stop 88 which is inside the nose piece 56. Sleeve stop 88 is also constructed from longitudinal segments separated by longitudinal splits. This construction allows it to expand radially as the mandrel 52 is withdrawn into it.

The mandrel 52, with split sleeve 54 installed, is inserted endwise through the nut mounting grommet 26 from the end of the grommet opposite the nut cage 30. The maximum diameter portion 66 of mandrel 52 is sized to fit through the center passageway and tubular shank 28. When the split sleeve 54 is on the minimum diameter portion 62 of mandrel 52 it has an outside diameter which can also fit through the passageway in tubular shank 28. As shown by FIG. 18, when the extended mandrel and split sleeve are inserted into the nut mounting grommet, end 84 of split sleeve 54 abuts end surface 86 of sleeve stop 88. The projecting end portion of tubular shank 28 is within nose piece 56. The end surface 76 of nose piece 56 is against wall 12, the sleeve 54 is within the tubular shank 28, and the increasing and maximum diameter portions 64, 66 of mandrel 52 are situated within the nut cage 30.

Referring to FIGS. 18 and 19, following insertion of the extended mandrel 52 and split sleeve 54 into the tubular shank portion 28 of grommet 26, the puller gun 58 is operated to retract the mandrel 52. As shown by FIG. 19, as the mandrel 52 is retracted the increasing diameter portion 64 and then the maximum diameter portion 66 of the mandrel 52 are moved in succession through the split sleeve 54. The increasing diameter portion 64 progressively expands the sleeve 54 until the maximum diameter portion enters into the split sleeve 54. The forceful movement of the increasing diameter and maximum diameter portion 64, 68 of mandrel 52 through the split sleeve 54 causes a radial expansion of the split sleeve 54. When the split sleeve 54 is expanded on the maximum diameter portion 66, the outside diameter of the split sleeve 54 is larger than the initial inside diameter of the tubular shank portion 28 of grommet 26. The radial expansion of the split sleeve 54 causes in turn a radial expansion of the tubular shank portion 28 of grommet 26. The expansion that occurs is sufficient to cause a permanent increase in the outside and inside diameters of the tubular shank 28. This radial expansion of the tubular shank 28 does two things. Firstly, it introduces fatigue life enhancing compressive residual stresses in the wall 12 immediately around the tubular shank 28. Secondly, it creates a tight interference fit between the tubular shank 28 and the sidewall of the opening 48. This tight interference fit secures the grommet 26 to the wall 12. As earlier described, the outer surface 52 of tubular shank 28 may be machined or otherwise treated in order to give it an increased coefficient of friction. For example, when the grommet 26 is being turned on a lathe a series of small grooves may be formed in the surface 52, so as to create outwardly projecting rings between the grooves which have sharp edges and will penetrate into the sidewall of the opening 48 when the tubular shank 28 is being expanded by the mandrel 52 in split sleeve 54.

For a more complete description of fatigue enhancement by cold expansion, reference is made to U.S. Pat. No. 3,566,662, granted Mar. 2, 1971, to Louis A. Champoux, and entitled "Coldworking Method and Apparatus", and to a paper by Joseph L. Phillips, entitled "Fatigue Improvement By Sleeve Coldworking". This patent and the paper are hereby incorporated herein by reference.

Following full retraction of the mandrel 52, the puller gun 58 is moved away from the wall 12. Split sleeve 54 may move away with it or be left inside the tubular shank 28. In the latter event, the split sleeve 54 is separately removed from the tubular shank 28 (FIG. 15). Next, the nut 20 is installed into the nut cage 30. It is moved endwise until its inner end surface is substantially against surface 36. Next, the sidewall portion 46 of the nut cage 30 is deformed. This may be done by use of a tool of the type shown by FIGS. 17 and 26-28. This tool 94 exerts a radially inwardly directed force on portion 46 at a plurality of locations spaced around its circumference. The applied force bends portion 46 inwardly at these locations, as will be hereinafter described in greater detail.

Figure 29:
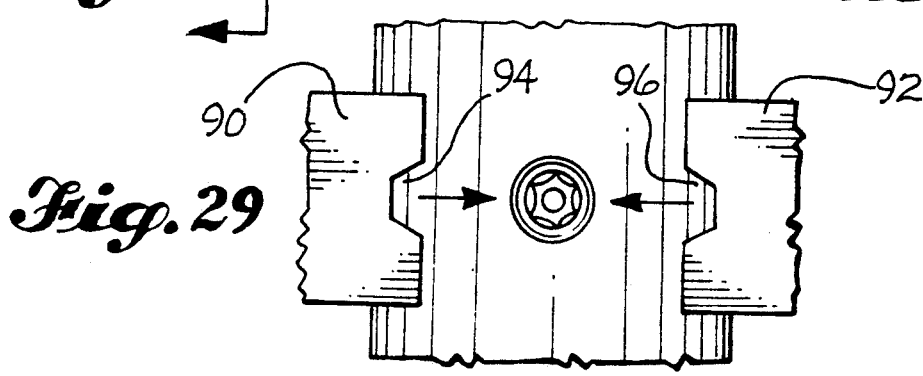
FIG. 29 is a fragmentary view of jaw portions of a pliers-like tool which may be used for squeezing the cup sidewall to form the wrench flats.

The cup or nut cage 30 initially has a circular cross section. As stated above, following the formation of the grommet 26 on a lathe, the sidewall portion of the cup 30, between the base 32 and the reinforcement ring 44, is squeezed by use of a pliers-like tool, to reshape it into a multisided cross section. As shown by FIG. 29 the tool 89 is a pliers-like tool and it includes jaws 90, 92. The jaws 90, 92 include recesses 94, 96, each having three sides separated by 120°. As will be apparent, when the two jaws 90, 90 are moved together, from opposite sides of the nut cage 30, such as by squeezing a pair of handles together, in a pliers-like action, the recesses 94, 96 reshape or deform the nut cage 30. This action provides the sidewall portion 40 of the nut cage 30, in its axial extent between the reinforcement rib 44 and base wall 32, with flattened sidewall portions 98, 98' (FIGS. 5 and 6) which function as wrench flats. These wrench flats 98, 98' engage the wrench flats 100 on the nut base 24 and hold the nut 20 from rotating as the bolt 14 is being screwed into it.

The reinforcement rib 44 is positioned adjacent the outer end of the nut 20 (FIG. 3). The turned end portions 104 of the lip 46 are positioned axially outwardly of the nut base 24, in the path of movement of nut 20 out from the nut cage 30. As shown in FIG. 3, the turned in portions 104 of lip 46, owing to their position in the path of movement of nut 20 out from the cup 30, prevent the nut 20 from moving out from the cup.

Figure 5:
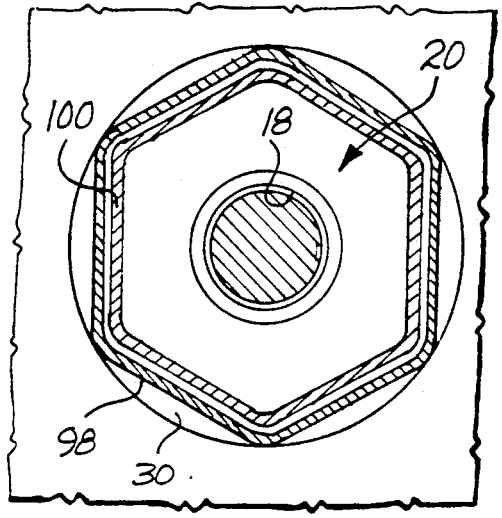
FIG. 5 is a cross-sectional view taken substantially along line 5, 6—5, 6 of FIG. 3, showing a first embodiment of the invention in which the nut cage is in the form of a tubular cup that is sized to, when formed, closely surround the nut.
Figure 6:
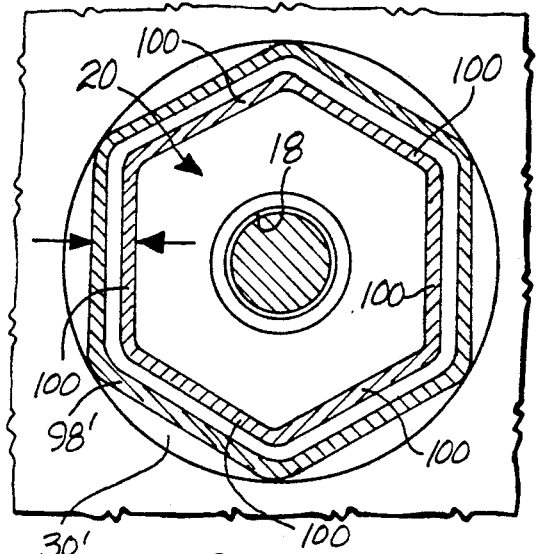
FIG. 6 is a view like FIG. 5, but of a second embodiment having a larger tubular cup which when deformed defines a nut receiving cavity which is slightly larger than the nut receiving cavity of the first embodiment, so as to provide space in the cavity to allow the nut to float sideways.

FIG. 5 shows a nut cage or cup 30 which when reshaped rather closely surrounds the nut 20. FIG. 6 shows a slightly enlarged nut cage or cup 30'. When deformed it presents wrenching wall portions 98' which are spaced apart a greater amount across the member 30. As a result, the cavity within the member in which the nut 20 is received is sufficiently larger than the nut 20 to permit the nut 20 to float laterally. Some degree of lateral float is desired as this makes it easier for the threaded end portion 16 of the bolt 14 to become aligned and be mated with the threaded opening 18 within the nut 20. As is shown by FIG. 6, any initial rotation of nut 20 in response to a turning of a bolt 14, will move the nut sidewalls 100 against the nut cage sidewalls 98'. Such contact will arrest any additional rotation of the nut 20 relative to the nut cage 30.

In the illustrated example the bolts 14 are shown to have countersunk heads 106 which are received within countersinks 108 formed at the entry end of a bolt opening 110 and a member 10. Heads 106 are shown to include a screwdriver slot 112. In use, the cover 10 needs to be removed frequently from the structure 114 of which the flange 12 is a part. If, after some use, a nut 20 should become damaged, a tapered end of a forming tool can be moved axially into the nut cage 30 for the purpose of straightening out the lip 46. This is done so that the damaged nut 20 can be removed and a new nut 20 installed in its place. Following such installation, the lip 46 is again turned in so as to form inwardly turned portions 104 which block passage of the new nut 20 out from the nut cage 30.

The nut cage 30 could be constructed without the lip 46. In such event the end portion of the cup 30 which includes the reinforcement rib 44 may be deformed inwardly to block removal of the nut 20 from the cup 30. According to the invention, there can be other constructions of the nut cage and some may involve other constructions of the nut. The provision of a nut mount which includes a tubular shank that is radially expanded within an opening in a wall to secure the nut mount to the wall is considered to be a significant invention apart from the construction of the nut and nut cage. An essential aspect to the invention is that the tubular shank is secured in the opening by radial expansion, followed by a securement of a nut to an end portion of the tubular shank. Also, the radial expansion of the tubular shank 28 can be performed by a mandrel only process, such as illustrated by FIGS. 22 and 23, or by a split mandrel process. In a mandrel only process, a larger mandrel 116 is used, without a split sleeve. The mandrel 116 is inserted through the grommet 26 from the nut cage side of the wall 12 and its base end 118 is connected to the puller tool (not shown) by a coupling action performed on the opposite side of the wall 12. Then, the puller tool is used to pull the mandrel 116 through the tubular bushing 28. The increasing diameter and maximum diameter portions 120, 122 of the mandrel 16 are sized to apply a radially outwardly directed force on the tubular shank 28 as they move through it. When this procedure is used a suitable lubricant should be applied between the mandrel and the inside wall of the tubular shank 28. This could be done by coating the inside wall of the tubular shank 28 with a solid lubricant.

Figure 26:
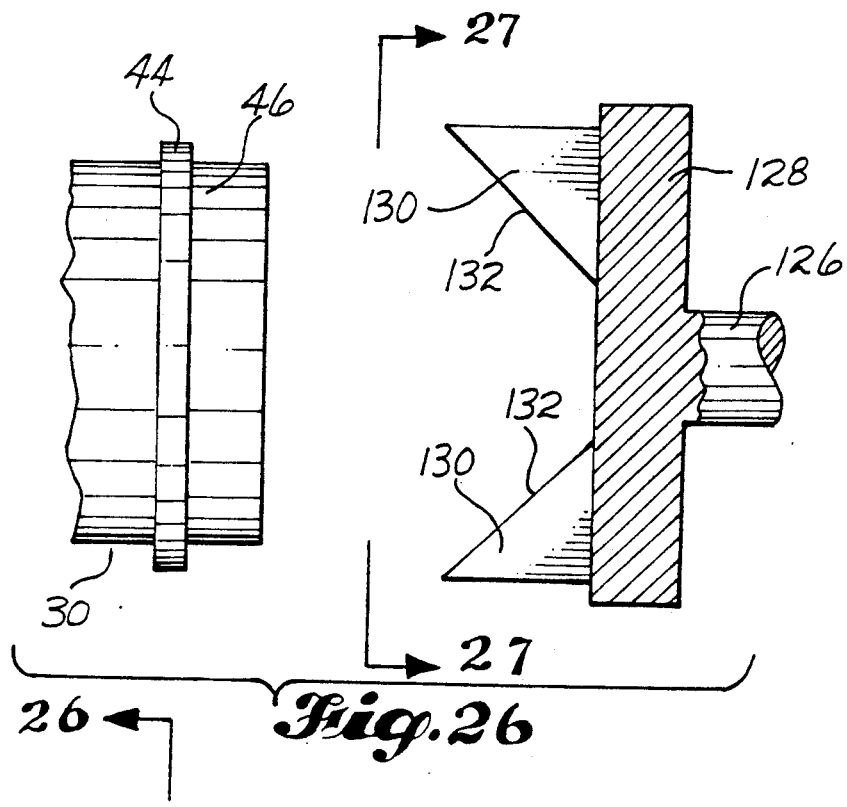
FIG. 26 is an enlarged scale axial sectional view of a tool for crimping or turning inwardly the outer end portion of the nut retainer, so as to block nut movement out from the retainer, such view being taken substantially along line 26—26 of FIG. 27.

FIGS. 24 and 25 illustrate the use of split sleeve expansion to secure into place a nut mounting grommet 26 which includes a nose piece 56' which has a smaller diameter than the tubular shank 28'. In FIG. 24 an end portion of the tubular shank 28' is shown to project outwardly from the side surface of wall 12 on the puller gun side of the wall 12. As shown by FIG. 26, when the puller gun is operated to retract the mandrel 52 into the puller gun, a force is applied onto the projecting end portion of the tubular shank 28' which is sufficient to flatten such end portion. The flattened end portion is forced into and deplaces some of the wall material. This flaring of the puller gun end of tubular shank 28' further secures the tubular shank 28' in the wall opening 48. Following removal of the puller gun from the installed nut mounting grommet 26, and following removal of the split sleeve (if used) out from the passageway in the tubular shank 28', it may be desirable or necessary to machine the end portion of the tubular shank 28' to make it smooth and flush with the surface of wall 12.

The nut retainer or cage 30 can be constructed to be like the nut retaining portions of the various devices disclosed by the aforementioned U.S. PAT. NOS. 2,421,201; 2,333,386; 4,768,907 (FIGS. 1-3 and the gate, in metal) and Swiss Patent No. 7,222/68. These are just some examples of many different constructions of the nut cup 30 and specially constructed nuts for use with each nut cage 30. A nut retainer of some sort at one end of the grommet is essential to the invention, but the particular construction of the retainer and the nut are not.

Figure 7:
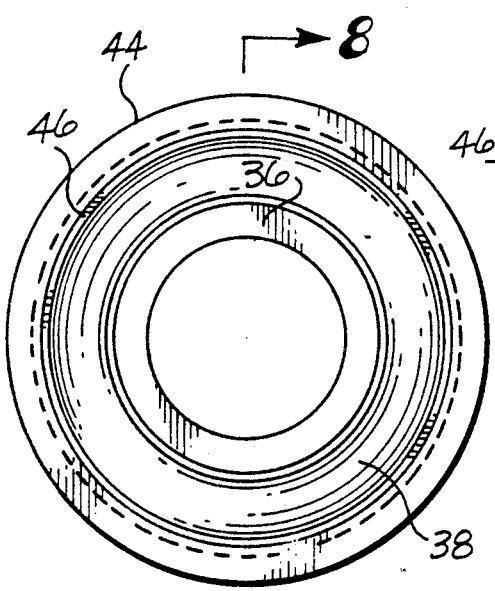
FIG. 7 is an end view of the preferred embodiment of the nut mounting grommet of the present invention, such view looking towards the tubular cup end of the grommet.

In FIGS. 7 and 8 the wall 40 of nut cage 30 is shown in its circular cross section form, prior to the formation of the wrench flats. The wrench flats have been omitted from FIGS. 11, 13-16, 18-20, and 22-24. This is because of the nature of the views. However, it is to be understood that the nut cage 30 in these views in fact has wrench flats.

Figures 27, 28:
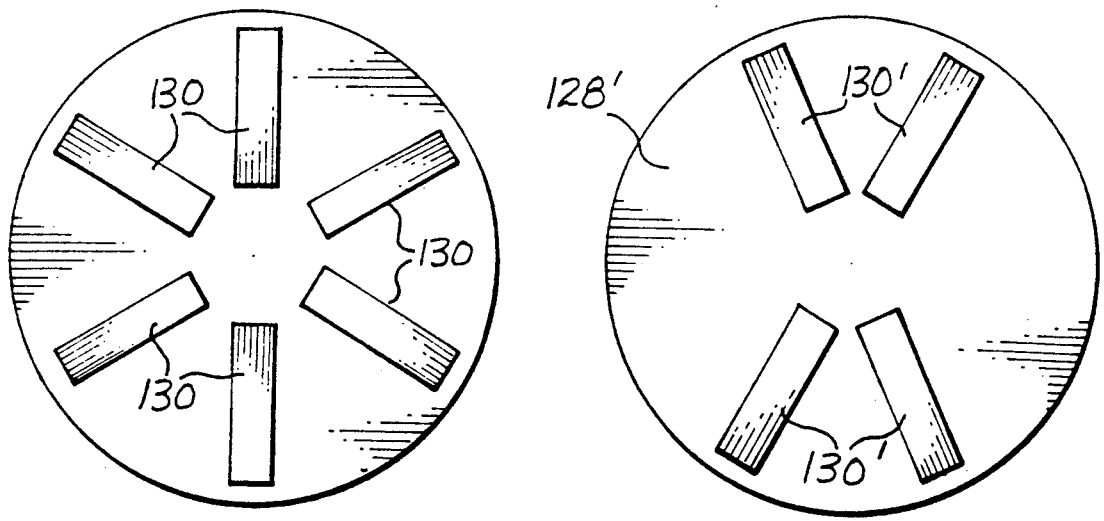
FIG. 27 is an end view of the tool shown by FIG. 26, taken substantially from the aspect of line 27—27 in FIG. 26.
FIG. 28 is an end view similar to FIG. 27, but of a modified construction of the tool.

Referring to FIGS. 26 and 27, in preferred form, the tool used for crimping wall portion 48 includes a stem 126, a head 128 connected to stem 126, and a plurality of camming elements 130 connected to and projecting axially outwardly from head 128. FIGS. 26 and 27 relate to an embodiment of the crimping tool which includes six camming elements 130. FIG. 28 shows a modified tool having a head 128 which carries four cam elements 130', in the pattern illustrated. In both embodiments, each cam element 130, 130' includes an oblique cam surface 132. By way of example, each cam surface may extend at an angle of 135° from the end surface of head 128, 128'. As shown by FIGS. 17 and 26, the toll is moved endwise towards wall portion 46 of nut cage 30, to first place cam surfaces 132 into contact with the edge of surface portion 46. Thereafter, additional axial movement of the tool towards the nut cage 30 causes the cam elements 130 to crush or deform the wall portion 46 inwardly, at each location of a cam element 130, 130'. This crushing continues until portions of wall portion 46 are positioned endwise outwardly of the nut within the nut cage 30, i.e. in a position to block movement of the nut out from the nut cage 30.

Figure 30:
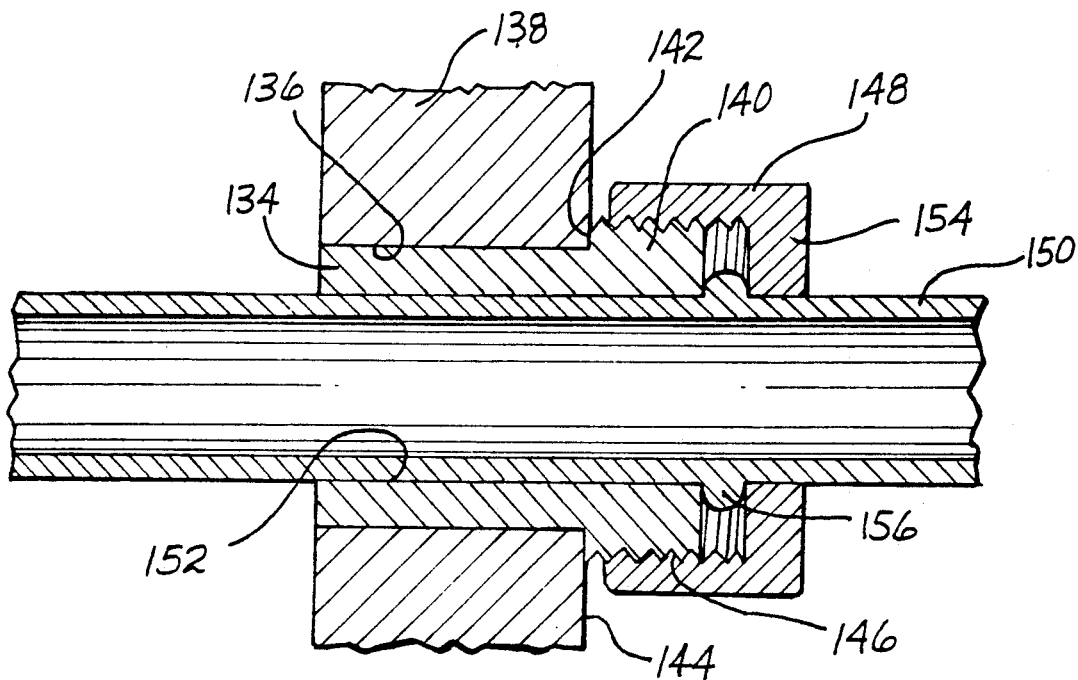
FIG. 30 is a longitudinal sectional view of another form of grommet, characterized by a head having a threaded periphery.

Referring now to FIG. 30, a grommet 134 is shown to be installed within an opening 136 in a wall 138. Grommet 134 is installed by radial expansion in one of the previously described ways. In this embodiment, the grommet 134 includes an enlarged head 140 presenting a shoulder 142 against the wall surface 144 where it immediately surrounds the opening 136 Head 140 is threaded at its outer periphery 146. These threads may receive the internal threads of a retainer nut 148. In this embodiment, for illustration purposes only, the retainer nut 148 is shown to be used with a length of tubing 150 which fits into the center opening 152 of the grommet. A radial wall portion 154 of nut 148 bears against a radial flange 156 that is formed on the tubing 150.

Figure 31:
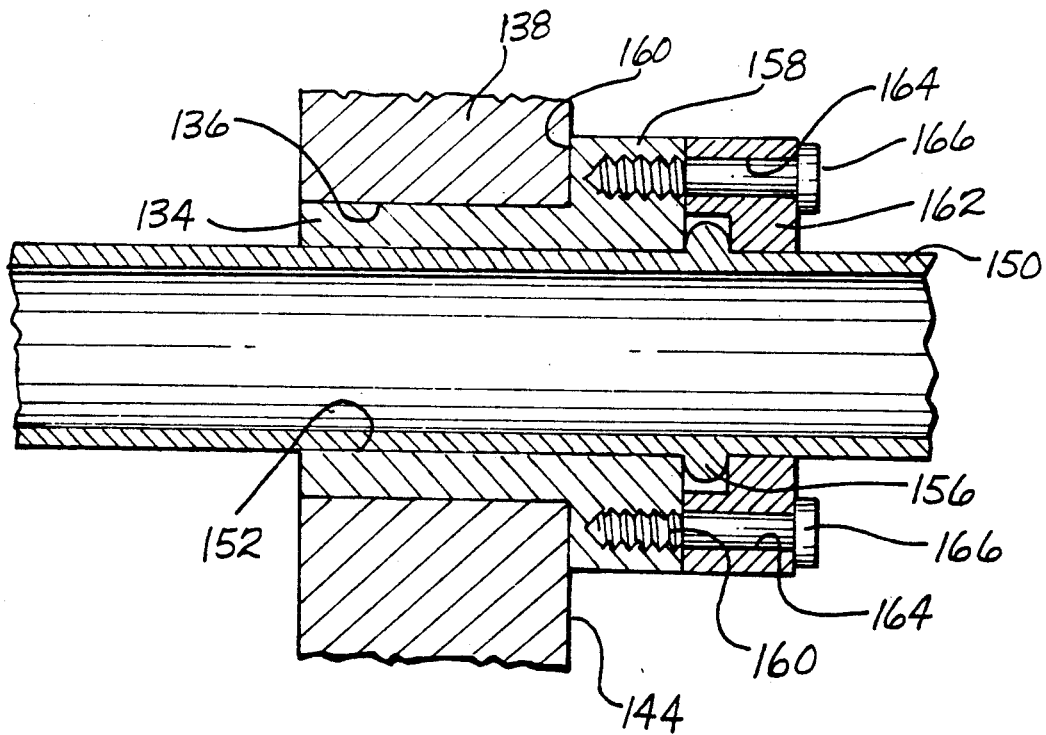
FIG. 31 is a view like FIG. 30 of yet another embodiment, characterized by a head having threaded bolt receiving openings.

FIG. 31 shows a similar installation. However, in this embodiment, the head 158 includes a plurality of internally threaded axial openings 160, a clamp washer 162 is shown positioned against the radial flange 156 on the tube 150. Openings 164 are provided in the washer 162. These openings 164 are equal in number and spacing to the threaded openings 160. Screw fasteners 166 are inserted through the openings 164 and are threaded into the openings 160, to secure clamp washer 162 against the head 158. In yet another embodiment, the threaded openings may be oriented to extend radially into the head 156, and adapted to receive set screws. Also, the embodiments of FIGS. 30 and 31, and the embodiment with radial threaded openings, may be used in installations other than the ones which are illustrated and described.

The preferred embodiment which has been illustrated and described, and the various alternative embodiments which have been either illustrated and described, or merely described, are presented to provide a better understanding of the invention, but are not to by themselves limit the scope of protection. The scope of protection is to be determined by the claims which follow, interpreted in accordance with established rules of patent claim interpretation, including use of the doctrine of equivalents.

What is claimed is:

1. A nut mounting grommet that is firmly connectable to a structural wall by use of a single circular opening in the wall, comprising:

a tubular shank having an outside diameter sized for close fit insertion into the circular opening, and a substantially uniform inside diameter;

a nut cage integral with the tubular shank at one end of the tubular shank, said nut cage being adapted to receive a nut following securement of the grommet to the wall, said nut cage including a base that is larger than the circular opening in the wall, and a radial shoulder formed where the tubular shank joins the nut cage, said shoulder being positioned substantially against the wall when the tubular shank is within the wall opening, and said base including a circular base opening that is in alignment with and substantially equal in diameter to the interior of the tubular shank, said base opening and said tubular shank forming a receiving passageway for expansion tooling;

said tubular shank being expandable radially by the expansion tooling, and being constructed from a material that in response to radial expansion on it will become permanently larger in diameter, and will make a tight interference fit with the wall opening to in that manner secure the grommet to the wall;

wherein the passageway in the grommet is sized to freely pass a bolt sized to make threaded engagement with the nut that is placed in the cage following securement of the grommet to the wall;

wherein said nut cage in the form of a cup into which the nut is placed, said cup having a sidewall portion which sized to project axially outwardly beyond a nut in the cup, said sidewall portion being deformable following insertion of the nut into the cup, to form a nut retainer positioned axially outwardly of the nut in the path of movement of the nut out from the cup; and wherein said cup includes a reinforcement girth ring encircling the cup adjacent the outer end of the nut.

2. A nut mounting grommet according to claim 1, comprising a lip which initially extends axially outwardly from the reinforcement rib, said lip being deformable to provide said nut retainer.

3. A nut mounting grommet according to claim 1, wherein said tubular shank has a length substantially equal to the thickness of the structural wall to which the grommet is to be secured.

4. A nut mounting grommet according to claim 1, wherein said shank has a length longer than the thickness of the structural wall to which the grommet is to be secured, so that and end portion of the shank will project out from the opening beyond the wall.

5. A nut mounting grommet according to claim 1, wherein said tubular shank has an outer surface treated to enhance the grip of the sidewall of the opening in the structural wall on the tubular shank when the tubular shank is expanded.

6. A nut mounting grommet according to claim 1, wherein the outer surface of the tubular shank is machined to include projections which when the tubular shank is expanded are moved into penetrating engagement with the sidewall of the opening to the structural wall, for enhancing attachment of the grommet to the structural wall.

7. A nut mounting grommet according to claim 1, wherein said nut cage is sized to permit some sideways float of a nut that is placed in the nut cage following securement of the grommet of the wall.

8. A nut mounting grommet that is firmly connectable to a sturctural wall by use of a single circular opening in the wall, comprising:
a tubular shank having an outside diameter sized for close fit insertion into the circular opening, and a substantially uniform inside diameter;
a nut cage integral with the tubular shank at one end of the tubular shank, said nut cage being adapted to receive a nut following securement of the grommet to the wall, said nut cage including a base that is larger than the circular opening in the wall, and a radial shoulder formed where the tubular shank joins the nut cage, said shoulder being positioned substantially against the wall when the tubular shank is within the wall opening, and said base including a circular base opening that is in alignment with and substantially equal in diameter to the interior of the tubular shank, said base opening and said tubular shank forming a receiving passageway for expansion tooling;
said tubular shank being expandable radially by the expansion tooling, and being constructed from a material that in response to radial expansion on it will become permanently larger in diameter, and will make a tight interference fit with the wall opening to in that manner secure the grommet to the wall;
wherein the passageway in the grommet is sized to freely pass a bolt sized to make threaded engagement with the nut that is placed in the cage following securement of the grommet to the wall;
wherein said nut cage is in the form of a cup into which the nut is placed, said cup having a sidewall portion which is sized to project axially outwardly beyond a nut in the cup, said sidewall portion being deformable following insertion of the nut into the cup, to form a nut retainer positioned axially outwardly of the nut in the path of movement of the nut out from the cup; and
wherein said cup includes a girth ring encircling the cup adjacent the outer end of the nut, and a lip which initially extends axially outwardly from said girth ring, said lip being deformable to provide said nut retainer, and said cup being dimensioned to permit some sideways float of the nut that is placed in it.

9. A nut mounting grommet that is firmly connectable to a structural wall by use of a single circular opening in the wall, comprising:
a tubular shank having an outside diameter sized for close fit insertion into the circular opening, and a substantially uniform inside diameter;
a nut cage integral with the tubular shank at one end of the tubular shank, said nut cage being adapted to receive a nut following securement of the grommet to the wall, said nut cage including a base that is larger than the circular opening in the wall, and a radial shoulder formed where the tubular shank joins the nut cage, said shoulder being positioned substantially against the wall when the tubular shank is within the wall opening, and said base including a circular base opening that is in alignment with and substantially equal in diameter to the interior of the tubular shank, said base opening and said tubular shank forming a receiving passageway for expansion tooling;
said tubular shank being expandable radially by the expansion tooling, and being constructed from a material that in response to radial expansion on it will become permanently larger in diameter and will make a tight interference fit with the wall opening to in that manner secure the grommet to the wall;
wherein the passageway in the grommet is sized to freely pass a bolt sized to make threaded engagement with the nut that is placed in the cage following securement of the grommet to the wall; and
wherein said nut cage is in the form of a cup into which the nut is placed following expansion of the tubular shank to secure the grommet to the wall, said cup having a tubular sidewall, and said nut cage base being formed by a radial wall which extends between the tubular shank and the tubular sidewall of the cup, with the side of said radial wall outwardly of the cup forming said shoulder, and with said radial wall including a radial surface outwardly bounding the circular base opening and a substantially semiannular groove formed in the base wall radially between said radial surface and said tubular sidewall, said groove providing a stress relieving radius between the radial wall and the tubular sidewall of the cup.

10. In combination:
a structural wall including a circular opening extending through the wall;
a nut mounting grommet including a tubular shank within said circular opening, said tubular shank being radially expanded in the opening to in that manner firmly secure the grommet to the wall; and
a nut cage integral with the tubular shank at one end of the tubular shank, said nut cage including a base that is larger than the circular opening in the wall, and a radial shoulder formed where the tubular shank joins the nut cage, said shoulder being against the wall, and said base including a circular base opening that is in alignment with and substantially equal in diameter to the interior of the tubular shank;

a nut positioned in and retained by the nut cage, said nut including a threaded bolt receiving opening that is coaxial with the passageway in the grommet;

wherein the passageway in the grommet is sized to freely pass a bolt of a size to make threaded engagement with the nut; and wherein said nut cage is in the form of a cup in which the nut is located, said cup having a tubular sidewall which includes a reinforcement girth ring encircling the cup adjacent the outer end of the nut.

11. The combination of claim 10, wherein the cup also includes a sidewall portion which extends axially outwardly beyond the nut and then extends inwardly to provide a nut retainer positioned axially outwardly of the nut in the path of movement of the nut out from the cup.

12. The combination of claim 10, wherein the tubular shank includes an outer surface providing projections which make penetrating engagement with the sidewall of the opening in the structural material, in response to radial expansion of the tubular shank, said penetrating engagement of the projections with the sidewall of the opening enhancing attachment of the grommet to the structural wall.

13. The combination of claim 12, wherein the nut cage includes nut capture means which restrains the nut substantially against the nut cage base, with its threaded bolt receiving opening coaxial with the passageway in the grommet.

14. The combination of claim 13, wherein the nut capture means includes a nut retainer spaced axially outwardly of the nut, in the path of removal of the nut out from the nut cage.

15. The combination of claim 13, wherein said nut capture means includes means for holding the nut against rotation relative to the grommet.

* * * * *